March 2, 1971 J. JASGUR 3,567,309
GLARELESS LIGHT VIEWING DEVICES
Original Filed Feb. 16, 1966

INVENTOR.
JOSEPH JASGUR
BY *Elliott & Pastoriza*
ATTORNEYS

United States Patent Office 3,567,309
Patented Mar. 2, 1971

3,567,309
GLARELESS LIGHT VIEWING DEVICES
Joseph Jasgur, 700 N. Fairfax Ave.,
Hollywood, Calif. 90046
Continuation of application Ser. No. 527,663, Feb. 16,
1966. This application Sept. 17, 1969, Ser. No. 866,415
Int. Cl. G02b 27/28
U.S. Cl. 350—156          2 Claims

ABSTRACT OF THE DISCLOSURE

A viewing device for examining objects incorporating a light source and a first polarizing means positioned in front of the light source to irradiate the object. Reflected light from the object in turn passes back through a second polarizing means positioned in line with a viewing opening and effecting polarization in a direction different from the first polarizing means. The difference in polarization is 90°, controlling glare and highlighting the object being examined.

---

This is a streamline continuation of Ser. No. 527,663, filed Feb. 16, 1966, now abandoned.

This invention relates generally to viewing devices and more particularly to improved viewing instruments using polarizing means.

It is well known that glare from light reflected from objects can be considerably reduced by viewing the object through a polarizing medium rotated to certain optimum angles. This reduction in glare is a direct consequence of the fact that when light is reflected from an object, the reflected light itself is polarized to some extent during the reflection process. By orienting the direction of polarization of a polarizing means so that the direction of this polarizing means is substantially at right angles to the direction of polarization of the light reflected from the object, a substantial amount of the glare is eliminated.

I have discovered that a vast improvement in the elimination of glare as well as an improvement in the definition of an object viewed, thus reducing eye strain and enabling an object to be seen more easily and clearly, can be realized as follows:

By illuminating the object with polarized light by a first polarizing means, and then viewing this object through a second polarizing means.

If the direction of polarization of the second polarizing means is oriented at substantially right angles to the direction of polarization of the first polarizing means, the object will be visible without any glare. Further, by orienting the second polarizing means, such as by rotating the same slightly to vary the angle of its polarization with respect to the direction of the incident light, various highlights of the viewed object may be emphasized, all to the end that more detailed and exact observations of various objects and subjects are possible.

It is accordingly a primary object of the present invention to provide improved viewing devices embodying the foregoing discovery.

More particularly, it is an object to provide improved viewing devices which substantially eliminate glare and other undesired reflections so that detailed observations can be made with a considerable reduction in eye strain.

Another important object is to provide an improved viewing device which incorporates its own light source and directs the light source in such a manner that observation of various objects or specimens is greatly facilitated.

A particular object of the invention is to provide a viewing device adapted for use, for example, by doctors, dentists, and biologists for examination of tissue, external skin areas, internal mucous membranes, and the like.

Still another important object is to provide a viewing device which is portable to the extent that it may be readily manipulated with one hand so that examination in normally inaccessible areas can be carried out.

Yet another important object is to provide a viewing device meeting the foregoing objects and incorporating magnifying means so that even greater detailed observations can be made.

Another object of this invention is to provide viewing devices of unique geometric design such that an object or other specimen to be viewed is strongly illuminated with a desired light intensity directed substantially along the viewing axis, thereby eliminating undesired shadows.

A particular object of this invention is to provide a viewing device incorporating adjustable means such that different areas or portions of an object under examination may be emphasized or highlighted.

Briefly, these and other objects and advantages of this invention are attained by providing a light source together with first polarizing means positioned in front of the light source in a manner such that polarized light is directed towards an object to be viewed. Cooperating with this structure is a second polarizing means together with suitable means for mounting and positioning the second polarizing means to receive reflected light from the object derived from the first polarized light and further polarize and direct this reflected light for viewing by a person's eye or for enabling photographs to be taken.

In some embodiments of this invention, the light source and first polarizing means are designed to project the polarized light for irradiating or illuminating an object directly along the viewing axis. In other embodiments, the light source is spaced slightly from the viewing axis but directed in such a manner as to realize maximum illumination.

In preferred embodiments, the second polarizing means is adjustable to enable variation of the polarizing angle relative to the initial polarized light direction.

A better understanding of the invention will be had by now referring to the accompanying drawings, in which.

Figure 1:
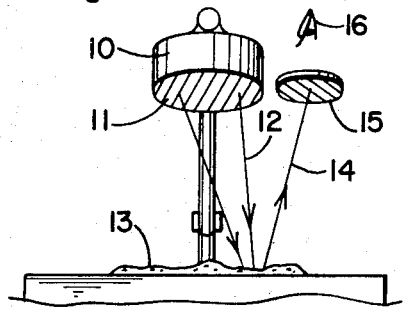
FIG. 1 is a schematic view useful in explaining the basic principles of the invention.

Referring first to FIG. 1, there is shown a light source 10 in combination with a first polarizing means 11 positioned in front of the light source. With this arrangement, there is provided polarized light indicated schematically by the beam lines 12. This light will be polarized in a given direction determined by the direction of polarization of the polarizing medium 11.

As shown, the polarized light 12 is directed to illuminate an object or specimen 13. This object or specimen, in turn, will reflect the polarized light 12 as indicated by the beam lines 14 and this reflected light, in turn, is viewed by a second polarizing means 15 positioned in front of a person's eye 16.

The direction of polarization of the second polarizing means 15 is oriented differently from the given direction of polarization of the light from the source 10. As schematically indicated by the parallel lines on the first and second polarizing mediums 11 and 15, these polarizing directions are at right angles.

If no rotation or polarization of the incident light on the object 13 took place at reflection, the right angular disposition of the respective polarizing directions would essentially block any of the reflected light from reaching the viewer's eye 16. However, as a consequence of further polarization being effected in the phenomenon of reflection, certain portions of the specimen 13 will be emphasized over other portions and a far finer definition is realized. In addition, glare is substantially eliminated.

Figure 2:
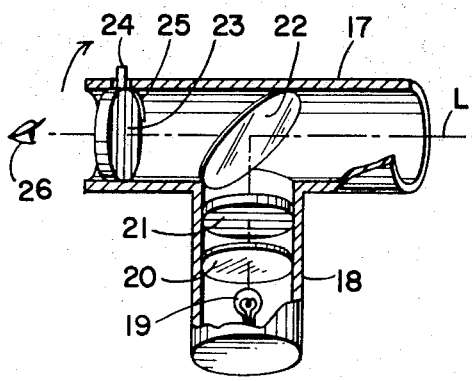
FIG. 2 is a perspective view, partly broken away, illustrating a first embodiment of the invention.

Referring now to FIG. 2, there is shown a first embodiment of the instrument incorporating the structure described in FIG. 1. As shown, the viewing device includes a casing generally of T-shape, the cross of the T being defined by a tubular portion 17 and the leg of the T by a second tubular structure 18. The tubular structure 17 is open at its right and left ends to define a light exit opening and a viewing opening, respectively. This second tubular structure 18 defines a first interior portion of the casing serving to house the light source indicated as a bulb 19, a condensing and focusing lens 20, and the first polarizing means 21. At the intersection of the tubular portion 18 with the cross tubular portion 17 of the T shape, there is disposed a partially reflecting mirror 22 oriented such as to direct polarized light from the light source and first polarizing means 21 outwardly along the axis of the tube 17 as indicated by the broken line L.

The left end of the tubular portion 17 defines a second interior portion serving to mount the second polarizing means 23. Also provided is a small rotating tab 24 arcuately movable in a slot 25 to enable rotation of the second polarizing means 23 so that its angle of polarization with respect to the direction of polarization of the light from the light source may be varied. The position of a viewer's eye is indicated at 26 so that the viewing direction is coaxial with the projected light.

In operation, the light source 19 is energized. Towards this end, there may be incorporated battery means directly in the tubular portion 18, or alternatively, wires may lead from the source 18 to a suitable power source. In either event, the tubular portion 18 serves both as a mounting and as a convenient handle for manipulating the device by a user with one hand.

With the light source energized, the user may readily direct the polarized light emanating from the exit end of the tubular portion 17 towards an object to be viewed, such as a mineral specimen or a living organ or other tissue to be examined. Light reflected from the object observed will pass back through the tubular portion 17 and be transmitted by the mirror 22 in view of its partial transparent properties to the second polarizing means 23 and thence to the viewer's eye. As stated heretofore in connection with FIG. 1, different detailed portions of the object may be highlighted by rotating the second polarizing means 23 to change its direction of polarization.

Figure 3:
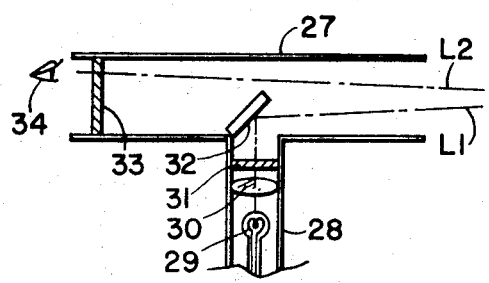
FIGS. 3 and 4 are schematic line drawings illustrating modifications of the embodiment of FIG. 2.

In FIG. 3, there is shown a modified version of the apparatus illustrated in FIG. 2. In this embodiment, there is again provided a casing of general T-shape wherein the cross of the T is defined by a tubular portion 27 and the leg of the T by a tubular structure 28. The light source is again incorporated in the tubular structure 28 as indicated at 29 together with a condensing lens 30 and first polarizing means 31. In the embodiment of FIG. 3, rather than a partially reflective mirror, there is provided a fully reflecting mirror 32 but of smaller dimensions than the interior diameter of the tubular portion 27. Light reflected from the mirror 22 is directed out the exit end of the tubular portion 27 along the broken line L1 and the reflected light from an object is received along the line L2 through the second polarizing means 33 and passed to a viewer's eye 34. The embodiment of FIG. 3 differs from that of FIG. 2 in that the directed illuminating light is not coaxial with the viewing axis. On the other hand, there is substantially no light loss as a consequence of the reflected light having to pass through a partially reflective mirror structure.

Figure 4:

FIG. 4 illustrates a further modification of the structure of FIG. 2 wherein there is again provided a casing in the form of a T structure having the cross T portion shown at 35 and the leg of the T shown at 36. A light source 37 is disposed in the leg of the T as shown and is immediately followed by a first polarizing means 38. A condensing and focusing lens 39 follows the polarizing means 38 and light therefrom is directed out the exit end of the cross T portion by a partially reflecting mirror 40. In the embodiment of FIG. 4, the second polarizing means is indicated at 41 and is formed directly on the rear of the mirror 40. Also provided in the embodiment of FIG. 4 is a magnifying lens 42 to enlarge the image observed by the viewer's eye 43.

Figure 5:
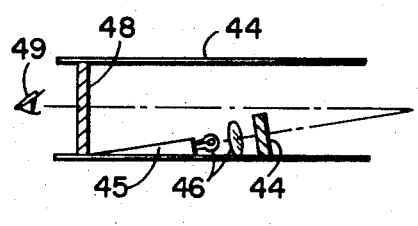
FIG. 5 is a schematic line drawing illustrating another embodiment of the invention.

In the embodiment of FIG. 5, the casing is in the form of a single elongated tube 44 rather than a T-shaped structure. A first interior portion of the tubular structure 44 constitutes part of the interior wall of the casing for supporting a light source mounting 45 for a bulb and projection lens combination 46 together with a first polarizing means 47. The second polarizing means is indicated at 48 in a position for viewing by a person's eye 49. In this embodiment, as in the case of the embodiment of FIG. 3, the polarized light for illuminating an object to be viewed is directed along an axis slightly different from the viewing axis. On the other hand, with the structure of FIG. 5, the tube 44 may be of small diameter so that it may be manipulated in close areas to enable observation under proper lighting conditions of normally inaccessible objects.

Figure 6:
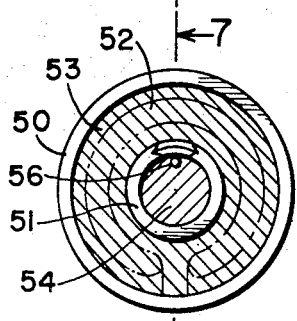
FIG. 6 is a front elevational view of still another embodiment of the invention.
Figure 7:
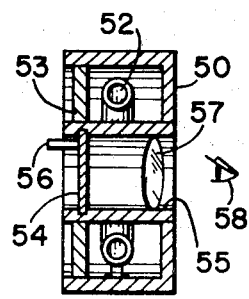
FIG. 7 is a cross section taken in the direction of arrows 7—7 of FIG. 6.

FIGS. 6 and 7 illustrate a somewhat larger version of the viewing apparatus wherein relatively large objects are to be viewed and require more than normal illumination. Referring first to the front view of FIG. 6, there is provided a casing structure 50 of generally circular shape including a concentric circular portion 51.

As shown in both FIGS. 6 and 7, the surrounding annular interior portion of the casing includes as a light source an elongated circular light generating means such as a fluorescent tube 52 positioned behind a first polarizing means 53. The central portion of the casing incorporates the second polarizing means 54 on substantially the same side of the casing and the viewing opening is circularly shaped in the back wall of the casing as shown at 55. By employing a circular viewing window structure, the second polarizing means 54 may be made circular to facilitate rotation of the same as by a rotating tab 56, whereby its angle of polarization may be varied with respect to the given direction of polarization of the first polarizing means 53. A magnifying lens 57 is positioned in the opening 55 for viewing by a person's eye as illustrated at 58.

Figures 8, 9:
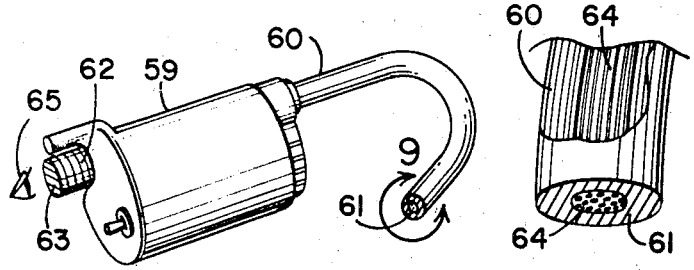
FIG. 8 is a perspective view of yet another embodiment of the invention.
FIG. 9 is an enlarged fragmentary view partly broken away of the portion enclosed by the arrow 9 of FIG. 8.

FIG. 8 shows another embodiment of the viewing device as incorporated in a fibre optics flexiscope. In this embodiment, there is provided a casing 59 housing in a first interior portion a light generating means for passing light along optically conducting fibres defining a flexible probe 60. A first polarizing means 61 is annularly disposed in front of the light emitting end of the probe 60 as best shown in FIG. 9.

A second portion of the casing mounts an eye piece 62 having a second polarizing means 63. As best seen in FIG. 9, a coaxial center set of fibres 64 conducts reflected light back up the probe to the eye piece and viewer's eye 65.

The advantage of the embodiment of FIGS. 8 and 9 resides in the realization of glareless light in flexiscope instruments finding wide application in medical examinations. In this respect, the principles of the invention are applicable to many other known types of medical viewing devices.

While all of the various embodiments of the invention have been described with respect to direct observation by a viewer's eye, it will, of course, be understood that suitable photographic apparatus may be used in conjunction with the viewing device to enable photographs to be taken. Further, while a means for adjusting the direction of polarization of the second polarizing means has been described in conjunction with some of the embodiments, it is to be understood that the first polarizing means associated with the light source may also be rotatably mounted so that the angle between the given direction of polarization of the light source and the viewed reflected light may be varied.

From the foregoing description, it will be evident that the present invention has provided greatly improved viewing devices wherein all of the various objects and advantages described heretofore are fully realized.

I claim:
1. A viewing device comprising, in combination:
   (a) a casing including a first annularly disposed interior portion having an annularly shaped light exit opening;
   (b) a second interior portion disposed in the central portion of said casing and having a viewing opening surrounded by said light exit opening;
   (c) a light generating means annularly extending about said first interior portion;
   (d) a first polarizing means positioned in front of said light source in said first interior portion for providing polarized light in a given polarization direction, said first interior portion directing said polarized light out said exit opening to irradiate an object to be viewed; and
   (e) a second polarizing means in alignment with said viewing opening in said second interior portion and positioned to receive reflected light from said object, said reflected light being derived from said polarized light and passing directly to said second polarizing means without passing through any intermediate polarizing optical element, said reflected light passing through said second polarizing, means directly out said viewing opening so that said device incorporates solely two polarizing means, said second polarizing means effecting polarization in a direction different from said given direction whereby glare from said object is eliminated, and whereby shadows, as a result of said polarized light irradiating said object, are minimized.

2. A device according to claim 1, including means for effecting relative rotation between said first and second polarizing means in a manner to vary the angle between said given polarization direction and said direction different from said given polarization direction.

References Cited

UNITED STATES PATENTS

| | | | |
|---|---|---|---|
| 3,405,990 | 10/1968 | Nothnagle et al. | 350—156 |
| 3,415,590 | 12/1968 | Adler | 350—159 |
| 2,318,705 | 5/1943 | Morgan | 350—156 |
| 2,501,446 | 3/1950 | Justice | 350—156 |
| 2,527,593 | 10/1950 | Stadler | 350—156X |
| 3,217,588 | 11/1965 | Chitayat | 350—96 |
| 3,267,932 | 8/1966 | Valliere | 350—96 |

OTHER REFERENCES

Kodak pamphlet "Photography by Polarized Light" (Eastman Kodak Company, Rochester, N.Y.), April 1936, p. 9, relied on.

DAVID SCHONBERG, Primary Examiner

P. R. MILLER, Assistant Examiner

U.S. Cl. X.R.

350—159